United States Patent [19]
Goldberg et al.

[11] Patent Number: 5,472,761
[45] Date of Patent: Dec. 5, 1995

[54] VIBRATION DAMPING SUPERABSORBENT COMPOSITES

[75] Inventors: Harris A. Goldberg, Edison; Joseph M. Pickton, New Providence, both of N.J.; Joseph J. DiBiase, Nazareth, Pa.; William T. Ryans, Huntersville, N.C.

[73] Assignee: Hoechst Celanese Corp., Somerville, N.J.

[21] Appl. No.: 169,855

[22] Filed: Dec. 17, 1993

[51] Int. Cl.$^6$ .................................................. B32B 01/06
[52] U.S. Cl. ............................... 428/76; 428/71; 428/72; 428/320.2; 252/62; 181/294
[58] Field of Search ..................... 428/71, 72, 76, 428/305.5, 320.2, 326, 327; 252/62; 524/916; 526/930; 181/207, 294; 206/204, 811

[56] References Cited

U.S. PATENT DOCUMENTS

| | | | |
|---|---|---|---|
| 4,076,663 | 2/1978 | Masuda et al. | 525/54.31 |
| 4,286,082 | 8/1981 | Tsubakimoto et al. | 526/240 |
| 4,353,433 | 10/1982 | Mohrenstein-Ertel et al. | 181/207 |
| 4,362,841 | 12/1982 | Minatono et al. | 524/531 |
| 4,389,513 | 6/1983 | Miyazaki | 525/186 |
| 4,507,438 | 3/1985 | Obayashi et al. | 525/119 |
| 4,654,039 | 3/1987 | Brandt et al. | 604/368 |
| 4,905,700 | 3/1990 | Wokalek et al. | 128/660.01 |
| 4,909,877 | 3/1990 | Nakanishi | 156/145 |
| 4,910,060 | 3/1990 | Nakanishi | 428/72 |
| 5,225,622 | 7/1993 | Gettle et al. | 86/50 |
| 5,300,606 | 4/1994 | Aizawa et al. | 526/307.6 |

FOREIGN PATENT DOCUMENTS

| | | |
|---|---|---|
| A0382627 | 8/1990 | European Pat. Off. . |
| A2923566 | 12/1980 | Germany . |

OTHER PUBLICATIONS

Database WPI, Week 7743, Derwent Publications Ltd., London, GB; AN 77–76727Y & JP–A–52 109 902 (Tanaka Ta) Sep. 14, 1977.
Database WPI, Week 8203, Derwent Publications Ltd., London, GB; AN 82–05026E & JP–A–56 159 225 (Kuraray K.K.) Dec. 8, 1981.
Database WPI, Week 9013, Derwent Publications Ltd., London, GB; AN 90–095300 & JP–A–2 047 010 (Sumitomo Bakelite K.K.) Feb. 16, 1990.
Database WPI, Week 8946, Derwent Publications Ltd., London, GB; AN 89–335939 & JP–A–1 249 820 (Dainippon Ink Chem. K.K.) Oct. 5, 1989.
International Encyclopedia of Composites, vol. 5, VCH (New York), pp. 178–218.

*Primary Examiner*—Patrick J. Ryan
*Assistant Examiner*—Marie R. Yamnitzky
*Attorney, Agent, or Firm*—Michael W. Ferrell

[57] ABSTRACT

Vibration damping composites suitable for use in construction panels or constrained-layer elements are described. The composites include a viscoelastic gel prepared from 99.5–92.5 wt. % water and 0.5–7.5 wt. % of a superabsorbent polymer. Preferably, the polymer is of the carboxylic acid type and optionally includes starch or cellulose.

6 Claims, 4 Drawing Sheets

VIBRATION DAMPING SUPERABSORBENT COMPOSITES

TECHNICAL FIELD

The present invention relates generally to passive structures useful for vibration damping and more specifically to the use of superabsorbent polymer/water gels for acoustic or other vibration damping.

BACKGROUND OF INVENTION

All substances in which molecules are sufficiently close to collide with one another have viscosity and there will be frictional losses when these substances are vibrated by any means, including sound waves. The common terminology is damping coefficient or loss factor. Fibrous materials make good sound absorbers. Glass fiber, mineral or rock wool and felts are all widely employed, in ceiling tiles, for example. The amount of absorption depends on the thickness, number of fibers per unit volume and the density of the product.

Moreover, the transmission loss in dB of a single-leaf finite wall is given by the well-known mass law:

$$TL_m = 20 \log mf - 48 \text{ dB}$$

where m is the mass of the wall in kilograms per square meter and f is the frequency. Various methods are employed to achieve acoustic damping properties in multi-layer walls including metal resilient channels and Thermafiber® mineral-fiber sound attenuation fire blankets.

For polymer materials, damping of energy is typically thought of as a consequence of viscoelasticity, that is, the behavior associated with viscous liquids and elastomeric solids. In viscous liquids the rate of deformation is proportional to the applied stress while in an elastomeric solid, deformation is proportional to the applied stress. Work is converted to heat by viscous liquids and is stored as potential energy by elastomeric solids. The interaction of viscoelastic materials with an applied sinusoidal strain is commonly described in terms of a storage modulus G' which is in-phase with the applied strain and a loss modulus G" which is 90° out of phase. The loss factor or damping term, tan δ, is described as:

$$\tan \delta = G''/G'$$

which is generally regarded as a measure of damping ability inherent in a material. The consensus is that to be an effective damping material for a constrained layer composite, a polymer should have a loss factor (tan δ) of at least about 0.05–0.1. Generally speaking, polymers become usable for sound damping in the region of their Tg values. A discussion of sound control and sound-damping technology is found in *International Encyclopedia of Composites*, Volume 5, pp. 178–218, VCH (New York 1991).

Superabsorbent polymer gels may have unexplored potential for vibration damping; their use as additives to rubber gaskets for tunnel construction has reportedly been at least suggested.

SUMMARY OF INVENTION

It has been found that gels containing from about 0.5 to about 7.5 weight per cent (wt. %) superabsorbent polymer and from about 99.5 wt. % to about 92.5% water possess loss factors which are suitable for use as vibration damping elements at room temperature. From about 0.75 to about 5 wt. % polymer and 99.25 to 95 wt. % water are typical since the loss modulus (G") decays rapidly as the gel becomes more solid in character, while the storage modulus increases with polymer concentration. The present invention is directed to composite structures containing such gels. Particularly preferred are gels containing from about 1 to about 4 wt. % polymer and from about 99 to about 96 wt. % water.

As noted above, as a transmission loss material the key issue is only the weight of the wall per square meter. At 100 hz a single leaf element of 11 b/sq.ft. (or about 18 kg/sq. meter) would thus provide almost 20 dB of extra transmission loss. In accordance with the present invention, composites are constructed with a gel layer density of anywhere from about 0.5 to about 7.5 lbs./sq.ft. From about 1 to about 3 lbs. per square foot is particularly preferred.

The superabsorbent polymer used in connection with the present invention may be of any suitable type. Such polymers are well known to those of skill in the art and have the capacity to absorb and retain, even under pressure, 500–1000 times their own weight in distilled water and 60–80 times their own weight in physiological saline solution. One method of making such polymers includes the use of acrylic acid, starch and a cross linking agent to produce a cross-linked, starch grafted superabsorbent resin. Resins of this class are manufactured and sold by Hoechst Celanese Corporation, Somerville, N.J. under the trademark Sanwet®. Other suitable resins include cross-linked polyacrylate copolymer such as those readily available. Manufacturers of superabsorbent resins include Hoechst Celanese Corporation, noted above, as well as American Cyanamid, Lowell, N.Y., Dow Chemical, Midland, Mich., and Nalco Chemical, Garyville, La.

Water is typically used to produce gels in accordance with the invention; however, saline and biocide/water or antifreeze solutions are likewise suitable throughout the various embodiments of the present invention.

The superabsorbent polymers used in connection with the present invention may be any known type as noted above. Synthesis of these polymers is described in detail in any of U.S. Pat. No. 4,076,633 to Masuda et al.; U.S. Pat. No. 4,286,082 to Tsubakimoto et al.; U.S. Pat. No. 4,507,438 to Obavashi et al.; U.S. Pat. No. 4,654,039 to Brandt et al. Generally speaking, superabsorbent polymers useful as a gel component with the present invention are made from: (a) at least one monomer which have a polymerizable double bond which is water soluble or may be made water soluble by hydrolysis; (b) a crosslinking agent; and optionally (c) a polysaccharide selected from the group consisting of starches and cellulose. Water soluble monomers with a polymerizable double bond and a hydrophilic radical used to make such polymers include carboxylic compounds such as acrylic acid, methacrylic acid, maleic acid, fumaric acid, maleic anhydride; as well as sulfonic acid compounds such as vinyl sulfonic acid, allylsulfonic acid, vinyltoluenesulfonic acid, styrenesulfonic acid, methacrylic sulfonic acids, sulfopropyl methacrylate; salts of the foregoing monomers; hydroxyl containing monomers such as alkylene glycols; and finally suitable amides and amines. If preferred, one may choose to utilize a hydrolyzable monomer, such as an ester which may be subsequently hydrolyzed to contain a hydrophilic group. Crosslinking agents useful to make superabsorbent polymers include polyvinyl compounds such as divinylbenzene, divinyltoluene, divinylxylene, or the like. If so desired, any natural or modified starch or cellulose may be included in the superabsorbent composition.

BRIEF DESCRIPTION OF DRAWINGS

The invention is described in detail below with reference to the various figures in which.

DETAILED DESCRIPTION

Figure 1:
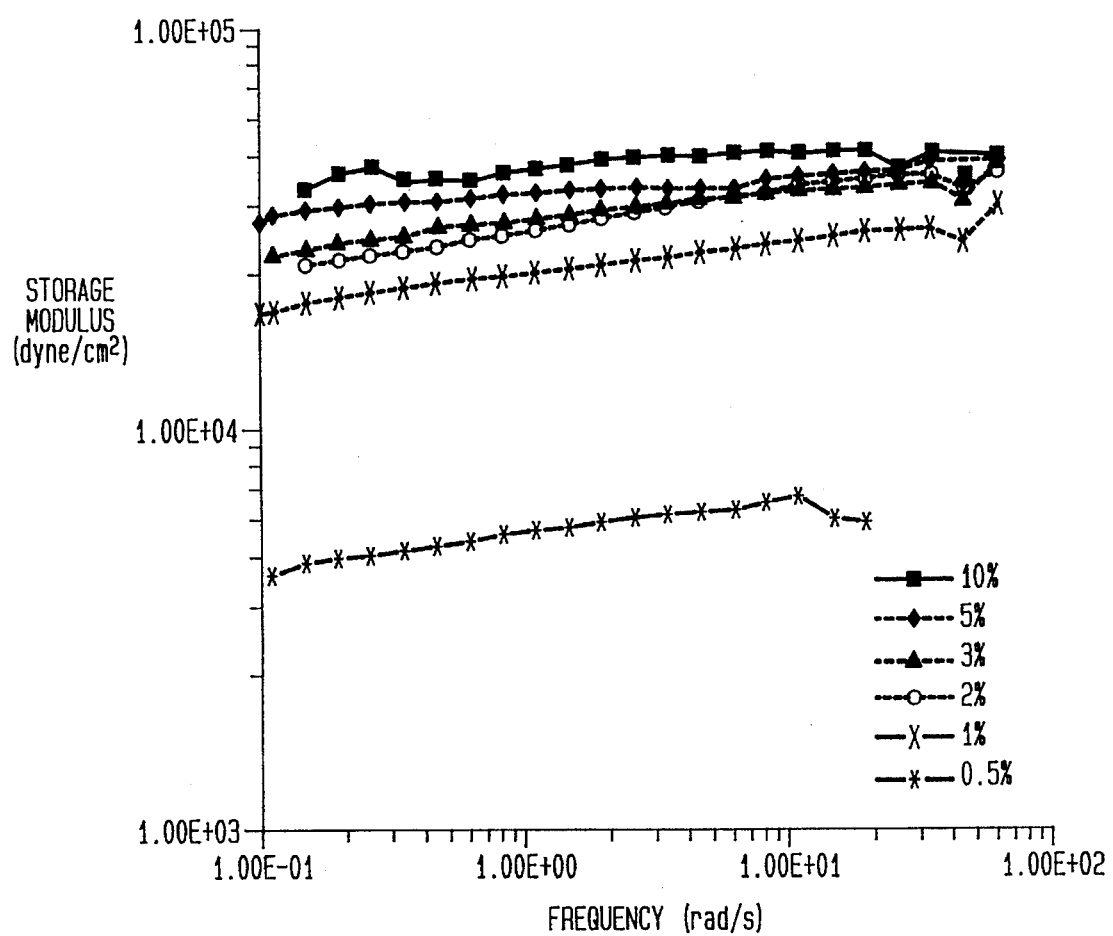
FIG. 1 is a plot of storage modulus against frequency at 25° C. for gels having 0.5, 1, 2, 3, 5 and 10 wt. % superabsorbent polymer, the balance being water.

Numerous examples and embodiments of the present invention are hereinafter described in detail. Such description is for purposes of illustration only as modification will be readily apparent to those of skill in the art. Generally speaking, the present invention is directed to composite structures with first and second sealing members and disposed therebetween a gel. The sealing members are operative to stabilize the gel, that is, to prevent moisture from escaping. In certain embodiments the cavity defined by the sealing members may be hermetic in character, capable of maintaining a pressure differing significantly from the surroundings. The gel is generally from about 0.5 to about 7.5 wt. % polymer, the balance being water; about 0.75 to about 5 wt. % polymer being typical and from about 1 to about 4 wt. % polymer being particularly preferred. As noted above, the superabsorbent polymers useful in connection with the inventive structures may be of the carboxylic or sulfonic acid type; which may be in acid or salt form. Superabsorbent polymers are typically crosslinked, with divinyl crosslinkers being especially preferred. Cellulose or starch are optionally incorporated into the polymer. Further, an inventive composite may include adjacent a sealed gel layer a high frequency absorbing material such as an open-celled foam material or a nonwoven fibrous material.

In one embodiment, hereafter described in detail, a quilted gel composite is produced from two films which are thermally bonded to define a plurality of cavities. The films may be of any suitable thickness generally from about 1 to about 50 thousandths of an inch; however, about 2 to about 20 thousandths of an inch is more typical. Polymer films, such as the thermoplastic polyolefins, polyethylene and polypropylene or a thermoplastic polyester film of polyethylene terephthalate are preferred. Films utilized may be biaxially oriented films if extraordinary toughness is desired as would be apparent to one of skill in the art. Advantages of the present invention include low cost, ease of installation (the gels may be formed in-situ if so desired), excellent low frequency absorption, fire retardance, and the fact that the gels will not flow; for example, when a panel is punctured.

While the following examples relate specifically to various compositions and structures, it is understood that the present invention is likewise applicable to methods of ameliorating vibration. For instance, a method of damping sound or other vibration includes either (a) enveloping an area or vibration source with one of the inventive composites or (b) positioning an inventive composite to impair vibration along a pre-determined direction.

EXAMPLES 1–6

Preparation of Gels and Measurement of Loss and Storage Modulii

A series of gels were prepared by mixing a predetermined amount of Sanwet® superabsorbent polymer (Hoechst Celanese Corporation) with water to achieve a uniform gel structure. This polymer is of the class described in U.S. Pat. No. 4,076,633 consisting of starch or cellulose, at least one monomer having a polymerizable double bond which is water soluble or becomes water soluble by hydrolysis and a crosslinking agent. The particular product used was Hoechst Celanese Corporation's IM 3900P powder. Gels were prepared having the following components in the amounts indicated below in Table 1.

TABLE 1

| Gel Compositions | | |
|---|---|---|
| Example | wt. % Polymer | wt. % Water |
| 1 | 0.5 | 99.5 |
| 2 | 1 | 99 |
| 3 | 2 | 98 |
| 4 | 3 | 97 |
| 5 | 5 | 95 |
| 6 | 10 | 90 |

Figure 2:
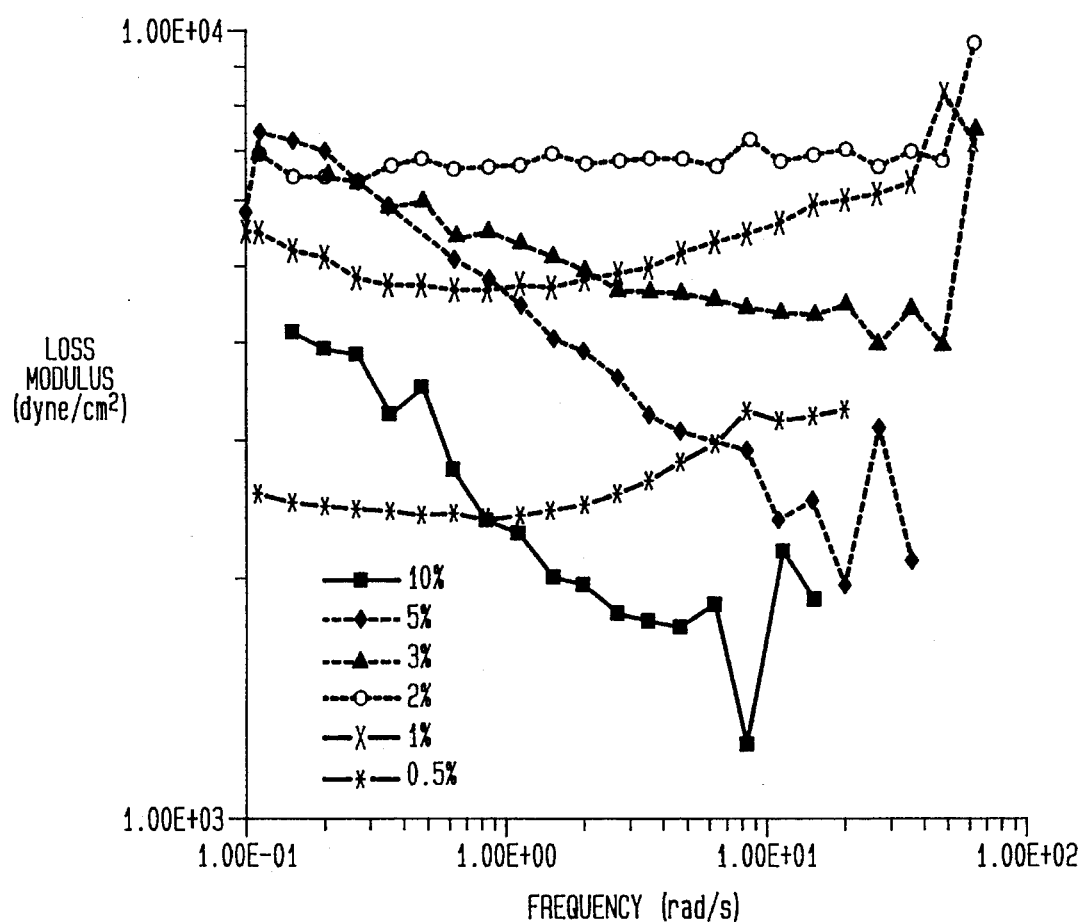
FIG. 2 is a plot of loss modulus against frequency at 25° C. for gels having 0.5, 1, 2, 3, 5 and 10 wt. % superabsorbent polymer, the balance being water.

Each sample was placed in a Rheometrics® dynamic stress rheometer and their storage and loss modulii (dynes/cm$^2$) measured as a function of frequency (radians/sec) at 25° C. Results appear in FIG. 1 and FIG. 2. It should be noted that the sample having only 0.5 wt. % polymer (Example 1) exhibited a relatively low storage modulus, demonstrating behavior similar to a liquid in this regard, while more solid-like characteristics were clearly present when the polymer concentration was increased to 1 wt. %.

Figure 3:
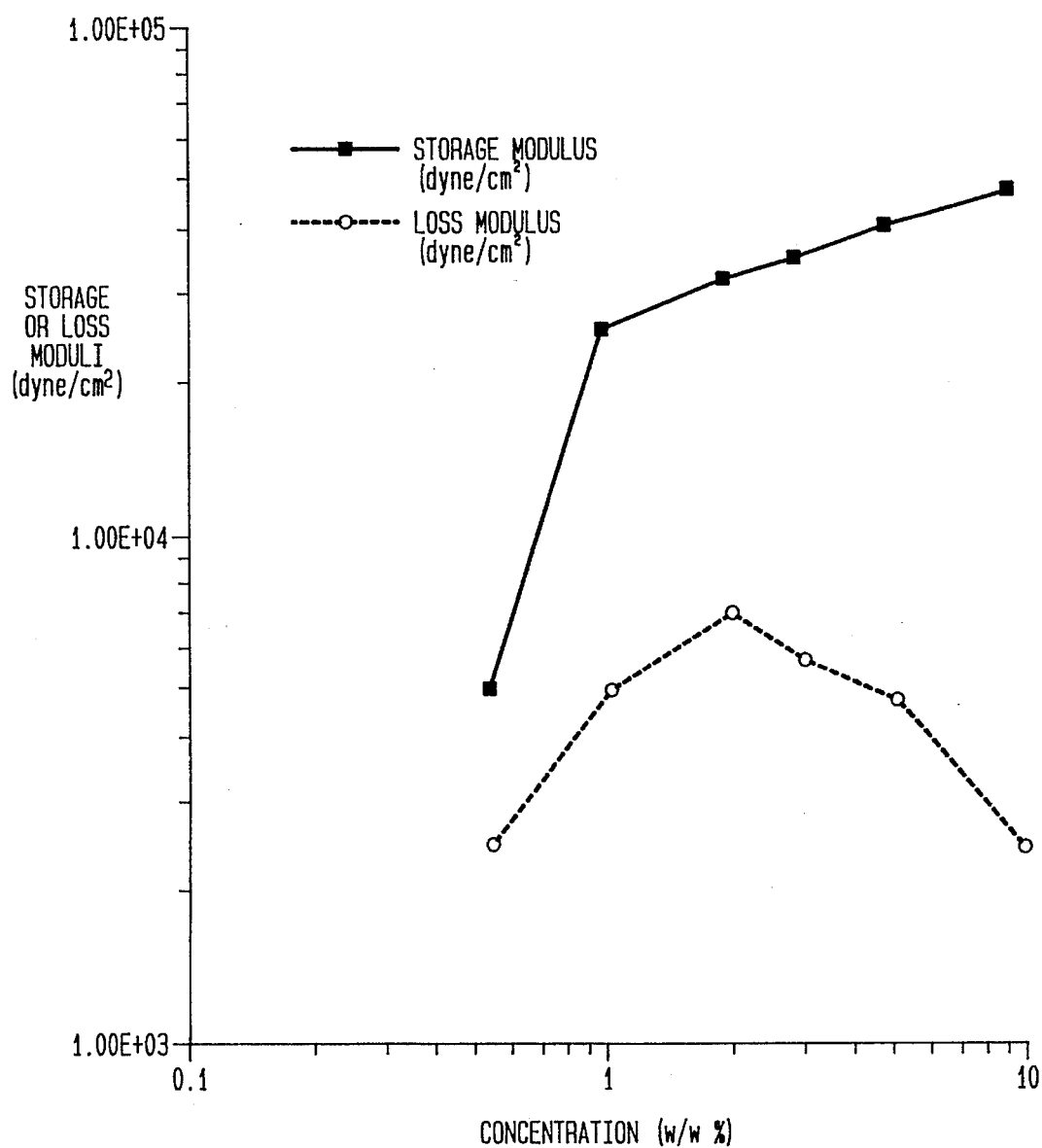
FIG. 3 is a plot of loss modulus and storage modulus against concentration for the gels of FIG. 1 and FIG. 2.

FIG. 3 is a plot of both storage and loss modulus as a function of concentration for the samples of Examples 1–6. As may be seen, the loss modulus exhibits a maximum of about $6 \times 10^4$ at a concentration of about 2 wt. % and decreases in both directions, i.e., both with increasing and decreasing polymer concentration. On the other hand, the storage modulus is more monotonic in character, constantly increasing with concentration. The loss factor (loss modulus/storage modulus) is unpredictable below about 0.5 wt. % polymer due to the liquid-like behavior of the gel and probably unacceptably low above about 7.5 wt. % polymer due to the rapid decay of the loss modulus.

EXAMPLE 7

Composite Sound-Damping Panel

Figure 4:
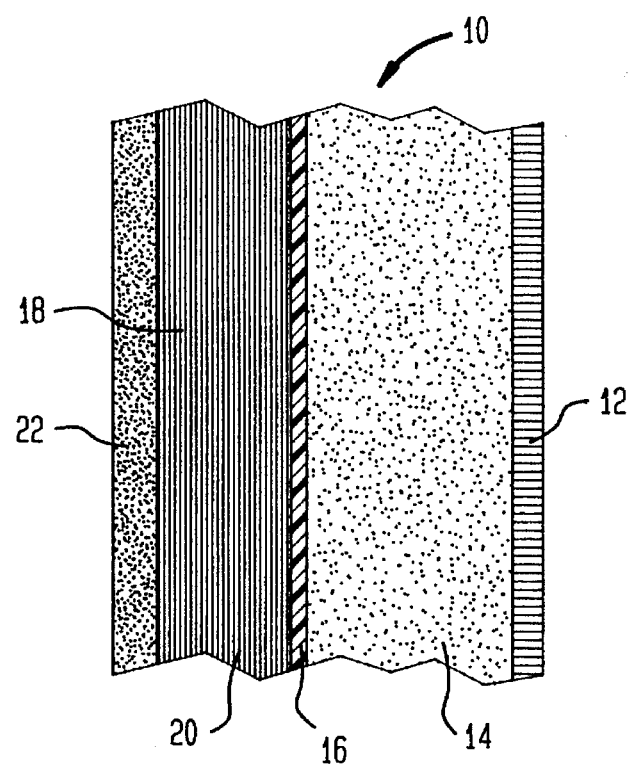
FIG. 4 is a schematic diagram of a view in elevation and cross section of a vibration damping panel constructed in accordance with the present invention.

Turning to FIG. 4, there is illustrated schematically in section a composite sound-absorbing panel 10 including a plurality of layers including a fabric 12 preferably having an open weave to allow sound to readily penetrate panel 10. Also included is a high frequency damping layer 14. Layer 14 is either an open-celled foam or nonwoven fibrous material such as those well known in the art to be useful for absorbing high frequency noise.

A moisture-sealing layer 16 is adjacent a gel layer 18 and is operable to confine moisture to the gel cavity 20 so that the gel does not dry under ambient conditions. In this respect, layer 22 is also impermeable to moisture so that the gel retains the amount of water desired. Sealing layers 12 and 16 may be of any suitable material such as plastic, rubber and the like as further noted below. Gel layer 18 is particularly effective for low frequency noise. Layers 16 and 22 may be polyester sheet, composite construction, films, polyacetal sheet, polycarbonate sheet, or the like. Materials are selected in general so as to have the desired structural properties; layer 22 typically being the stiffest member for structural support. Gel layer 18 contains a gel with anywhere from 0.5 to about 7.5 wt. % superabsorbent polymer, with the balance being water as noted above. Layer 18 may be a continuous layer of gel only, or may be discrete of gel granules immobilized in a matrix with the requisite amounts of water and polymer as specified herein. The immobilized granular structure is well known in the art and includes granular polymer dispersed within a non-woven cellulosic fiber matrix. Alternate means of fixing the gels of the present invention could include, for example, laminating dry superabsorbent polymer between permeable sheets and later wetting the structure.

A particular advantage of a panel such as panel 10 is that it could be transported and installed while dry and later welted to enhance damping characteristics. In this way, one avoids shipping and handling a large portion of the weight. Once in place, panel 10 is inherently fire resistant due to the high water content, and exhibits high transmission loss due to its weight.

As noted earlier, the mass law predicts that transmission loss depends upon weight. The present invention provides significant conveniences in that the necessary weight can be added to a structural member once it is in place. One way to accomplish this may be to add a polymer film lining to a hollow wall and add the gel to the sealed cavity thereby defined by spraying the gel into the cavity, much as other thermal insulation is sometimes added. Of course, feed-through for electrical, plumbing and other utilities is readily provided by proper design of the sealed cavity.

EXAMPLE 8

Laminated Quilt Structure

A particular advantage of this embodiment of the present invention is that it may be punctured in one compartment, e.g., nailed to building studs, and other discrete compartments will be unaffected. In many respects, this embodiment resembles packing material of the bubble type, wherein the cavities in the structure are filled with the gels described above, that is with 0.5 to 7.5 wt. % polymer, the balance being water.

Figure 5:
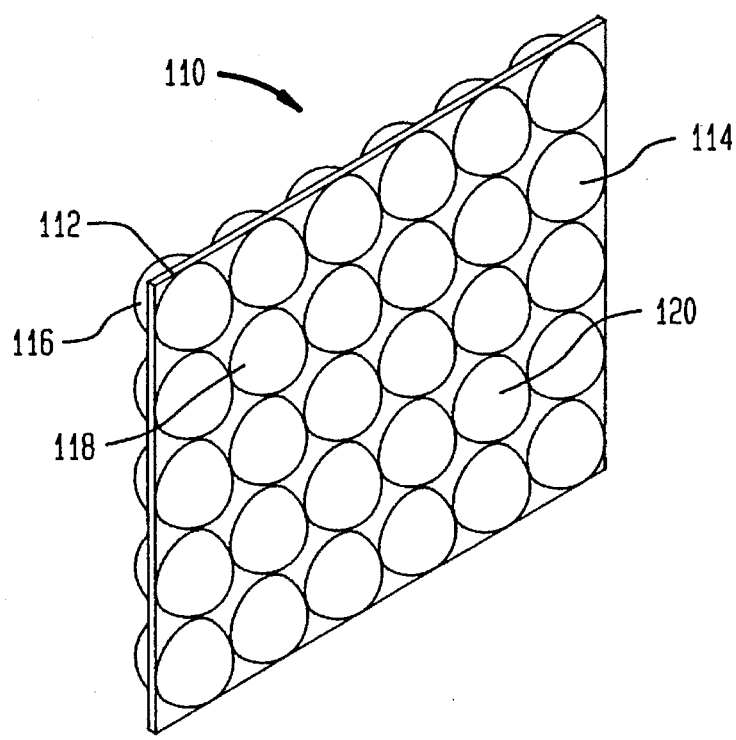
FIG. 5 is a perspective view of a gel-containing quilted film structure.

Turning to FIG. 5, there is shown in perspective a quilted structure 110 which includes upper and lower impermeable films 112,114 respectively joined at a plurality of closed, continuous polygonal or circular joints as shown to define a plurality of discrete and isolated cavities 116,118 and 120 for example. Each cavity is individually sealed, self-contained and is a separate, isolated impermeable cavity such as the illustrated cavities 116,118 and 120. Within the cavities there is disposed a gel in accordance with the present invention. Generally, the film 112,114 have a thickness of from about 1 to 50 thousandths of an inch; 2 to 20 being more preferred. While any suitable construction method may be used, it is preferred to use a thermoplastic film so that the structure may be simply melt-bonded together. Particularly preferred material for films 112,114 thus include polyolefins such as polypropylene and polyethylene or thermoplastic polyesters such as polyethylene terephthalate. Especially preferred films include biaxially oriented films.

Having described the invention in numerous aspects and embodiments further description is believed unnecessary.

We claim:

1. A multilayer vibration-damping composite comprising in combination a plurality of moisture-impermeable sealing members defining a hermetically sealed cavity and disposed in said cavity a hydrogel consisting essentially of from about 99 to about 96 wt. % water and about 1 to about 4 wt. % superabsorbent resin, said superabsorbent resin comprising a carboxylic acid residue and a crosslinking agent to render said resin water-insoluble, wherein said hydrogel exhibits a storage modulus of greater than 10,000 dynes/cm$^2$ at 25° C. and a loss modulus of greater than 3,000 dynes/cm$^2$ at 25° C., said storage and loss modulus exhibiting the values recited above over a frequency range of from 0.1 radians/sec to 100 radians/sec.

2. The composite according to claim 1, wherein said superabsorbent resin additionally comprises cellulose.

3. The composite according to claim 1, wherein said superabsorbent resin additionally comprises starch.

4. The composite according to claim 1, wherein at least one of said sealing members comprises a polymer film.

5. The composite according to claim 4, wherein said polymer film is polypropylene.

6. The composite according to claim 4, wherein said polymer film is polyethylene terephthalate.

* * * * *